United States Patent
Kononov et al.

(10) Patent No.: US 8,819,774 B2
(45) Date of Patent: *Aug. 26, 2014

(54) SYSTEM AND METHOD FOR PROTECTING CLOUD SERVICES FROM UNAUTHORIZED ACCESS AND MALWARE ATTACKS

(71) Applicant: Kaspersky Lab ZAO, Moscow (RU)

(72) Inventors: Eldar M. Kononov, Moscow (RU); Anton S. Lapushkin, Moscow (RU); Andrey A. Efremov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,592

(22) Filed: Feb. 1, 2014

(65) Prior Publication Data

US 2014/0181530 A1 Jun. 26, 2014

Related U.S. Application Data

(63) Continuation of application No. 13/866,006, filed on Apr. 18, 2013, now Pat. No. 8,661,547.

(30) Foreign Application Priority Data

Dec. 25, 2012 (RU) ................................ 2012156436

(51) Int. Cl.
- *H04L 12/12* (2006.01)
- *G06F 17/30* (2006.01)
- *H04L 12/16* (2006.01)
- *H04L 29/06* (2006.01)

(52) U.S. Cl.
CPC ....... *G06F 17/30082* (2013.01); *H04L 2209/76* (2013.01); *H04L 63/102* (2013.01)
USPC ................................................. 726/1; 726/30

(58) Field of Classification Search
None
See application file for complete search history.

(56) References Cited

U.S. PATENT DOCUMENTS 7,587,367 B2  9/2009  Mengerink
7,640,589 B1  12/2009  Mashevsky et al.
(Continued)

FOREIGN PATENT DOCUMENTS

EP   2267629 A2   12/2010

OTHER PUBLICATIONS

EPO Extended Search Report from counterpart EP Application No. 13 172 224.1-1957.

(Continued)

*Primary Examiner* — Venkat Perungavoor
(74) *Attorney, Agent, or Firm* — Arent Fox LLP; Michael Fainberg

(57) ABSTRACT

Disclosed are systems, methods and computer program products for protecting cloud security services from unauthorized access and malware attacks. In one example, a cloud server receives one or more queries from security software of the user device. The server analyzes a system state and configuration of the user device to determine the level of trust associated with the user device. The server also analyzes the one or more queries received from the security software to determine whether to update the level of trust associated with the user device. The server determines, based on the level of trust, how to process the one or more queries. Finally, the server provides responses to the one or more queries from the security software based on the determination of how to process the one or more queries.

20 Claims, 5 Drawing Sheets

(56) References Cited

U.S. PATENT DOCUMENTS

| | | |
|---|---|---|
| 8,060,577 B1 | 11/2011 | Conrad |
| 8,201,255 B1 | 6/2012 | Nachenberg |
| 8,214,905 B1 | 7/2012 | Doukhvalov et al. |
| 8,239,953 B1 | 8/2012 | Satish et al. |
| 8,250,657 B1 | 8/2012 | Nachenberg et al. |
| 8,341,745 B1 | 12/2012 | Chau et al. |
| 8,375,452 B2 | 2/2013 | Raviv |
| 8,448,245 B2 | 5/2013 | Banerjee et al. |
| 2003/0167308 A1 | 9/2003 | Schran |
| 2004/0252837 A1 | 12/2004 | Harvey et al. |
| 2006/0212931 A1 | 9/2006 | Shull et al. |
| 2006/0253584 A1 | 11/2006 | Dixon et al. |
| 2007/0124283 A1 | 5/2007 | Gotts et al. |
| 2007/0192855 A1 | 8/2007 | Hulten et al. |
| 2007/0214151 A1 | 9/2007 | Thomas et al. |
| 2008/0005285 A1 | 1/2008 | Robinson et al. |
| 2008/0022384 A1 | 1/2008 | Yee et al. |
| 2008/0028443 A1 | 1/2008 | Adelman et al. |
| 2008/0072049 A1 | 3/2008 | Cross et al. |
| 2008/0082662 A1 | 4/2008 | Dandliker et al. |
| 2008/0109491 A1 | 5/2008 | Gupta |
| 2008/0141366 A1 | 6/2008 | Cross et al. |
| 2009/0282476 A1 | 11/2009 | Nachenberg et al. |
| 2009/0287819 A1 | 11/2009 | Iverson |
| 2009/0328209 A1 | 12/2009 | Nachenberg |
| 2010/0325704 A1 | 12/2010 | Etchegoyen |
| 2011/0023131 A1* | 1/2011 | Hjelm et al. .................... 726/29 |
| 2011/0067086 A1 | 3/2011 | Nachenberg et al. |
| 2011/0083180 A1 | 4/2011 | Mashevsky et al. |
| 2011/0258443 A1 | 10/2011 | Barry |
| 2012/0174237 A1 | 7/2012 | Krzyzanowski |
| 2012/0185942 A1 | 7/2012 | Dixon et al. |
| 2012/0204221 A1* | 8/2012 | Monjas Llorente et al. ...... 726/1 |
| 2012/0290427 A1 | 11/2012 | Reed et al. |
| 2012/0311705 A1 | 12/2012 | Dixon et al. |

OTHER PUBLICATIONS

Hoffman, Kevin, David Zage and Cristina Nita-Rotaru. "A survey of attack and defense techniques for reputation systems." ACM Computing Surveys (CSUR) 42.1 (2009).

Kalepu, Sravanthi, Shonali Krishnaswamy, and Seng Wai Loke. "Reputation= f (user ranking, compliance, verity)."Web Services, 2004. Proceedings. IEEE International Conference on. IEEE, 2004.

Müller, Wolf et al. "Sybil proof anonymous reputation management." Proceedings of the 4th international conference on Security and privacy in communication networks. ACM, 2008.

* cited by examiner

SYSTEM AND METHOD FOR PROTECTING CLOUD SERVICES FROM UNAUTHORIZED ACCESS AND MALWARE ATTACKS

CROSS-REFERENCE TO RELATED APPLICATIONS

The present Application for Patent is a Continuation and claims priority to patent application Ser. No. 13/866,006 entitled "SYSTEM AND METHOD FOR PROTECTING CLOUD SERVICES FROM UNAUTHORIZED ACCESS AND MALWARE ATTACKS" filed Apr. 18, 2013, which claims the benefit of priority under 35 U.S.C. 119(a)-(d) to a Russian Application No. 2012156436 filed on Dec. 25, 2012, the disclosure of each of which is hereby incorporated by reference herein.

TECHNICAL FIELD

The present disclosure generally relates to the field of computer security, and more specifically to systems, methods and computer program products for protecting cloud-based reputation and other services from unauthorized access and malware attacks.

BACKGROUND

Computer information systems have an important role to play in modern society. However, there has also been a notable increase in recent years in the number of computer threats, including malicious software (i.e., malware), such as viruses, worms, Trojans, etc., as well as system and network attacks, such as denial of service attacks, etc.

There are different methods for detection of malicious software and attacks. The conventional signature method is based on the creation of unique code signatures or behavior templates for malware and their subsequent comparison with a suspect program or file. However, information about new malware usually reaches antivirus companies with delay. It also takes a considerable time for updates containing new malware signatures to be sent to the computers of antivirus software users. Consequently, there is a substantial time lag between the emergence of new malware and the receipt by the users of updated malware signature, and during this time a large number of computers may be infected with malware.

Heuristic analysis is another conventional method for detection of malware, which is based on the analysis of program code and emulation of its executable commands. This method, unlike the signature method, is more effective in detecting new malicious software. On the other hand, heuristic analysis methods have an inadequate level of detection and result in many false positives, i.e., sometimes identifying legitimate software as malicious.

Recently, there has been widespread adoption of computer defense systems that use cloud-based reputation services, such as Kaspersky Security Network. These systems are superior to the conventional systems in terms of their response time and the detection rate of new malware. Typically, a plurality of reputation services is used to form a cloud infrastructure of the antivirus company. These services collect from antivirus applications deployed on users' computers and analyze information about attempted malware infections and unknown suspicious files that were downloaded and executed on the user's computers. Using cloud services, an antivirus company can react rapidly to new security threats while reducing the number of false malware detections by leveraging information from many of its users.

The cloud reputation services of the antivirus company may use different factors to analyze whether files and programs detected on users' computers are safe or malicious. Some of these factors are described, for example, in the commonly owned U.S. Pat. No. 7,640,589. These factors may include, but not limited to, the presence of a digital signature of the analyzed program; the time of creation and first detection of the program; the reputation of the program, which can be based on the total number of users of this program; the geography of program's usage, etc. The program may also be analyzed in the cloud using conventional analysis methods and with the assistance of virus analysts. The resulting decision as to the safety or maliciousness of the program may be sent to all users of the cloud reputation services who executed this program on their computers or downloaded it from the Internet.

In spite of the high level of detections provided by the cloud reputation services, they can be discredited through the actions of unauthorized users or malware attacks. For example, an unauthorized user or malware residing on user's computer that knows the protocol for communication with the cloud reputation service can send false information to the cloud service. In another example, before a new type of malware is released into the Internet, the malware creator can send to the reputation service information confirming "safety" of this malware from a large number of trusted computer user, which may convince the cloud reputation service that the malware is in fact safe. Consequently, when the malware is released into the Internet, other users of antivirus software will accept it as safe as well.

Accordingly, there is a need for a mechanism for protecting cloud-based reputation services from unauthorized access and malware attacks.

SUMMARY

Disclosed are systems, methods and computer program products for protecting a cloud reputation and other services from unauthorized access and malware attacks. In one example aspect, a method in a cloud server for processing queries from user devices includes receiving one or more queries from security software of a user device. The server analyzes a system state and configuration of the user device to determine the level of trust associated with the user device. The server analyzes the one or more queries received from the security software to determine whether to update the level of trust associated with the user device. The server determines, based on the level of trust, how to process the one or more queries. The server provides one or more responses to the one or more queries from the security software based on the determination of how to process the one or more queries.

In various aspects, the system state and configuration analysis of the user device includes, but not limited to checking for execution of various OS processes and services on the user device, checking for periodic rebooting or updating of the OS of the user device, checking for installation, execution or deletion of programs on the user device, checking for Internet browsing activity on the user device, checking for installations and updates of the security software of the user device, checking for keystrokes, mouse clicks and mouse movements on the user device, and checking for movements of a user via a webcam of the user device.

In various aspects, the analysis of the one or more queries received from the security software to determine whether to update the level of trust of the user device includes, but not limited to checking whether the security software followed a correct procedure for sending the queries, checking for changes in the state and configuration of the user device in a predefined time period since the last system state and configuration analysis of the user device, checking for changes in the location of the user device in a predefined time period.

In another aspect, the analysis of the one or more queries received from the security software to determine whether to update the level of trust of the user device includes checking whether a query includes an encrypted unique identifier associated with the user device and a hash sum of the data contained in the query, decrypting the unique identifier and verifying that the decrypted unique identifier is associated with the user device from which the query was received; computing a hash sum of the data contained in the received query and comparing the computed hash sum of the received data with the hash sum included in the received query to determine whether the data contained in the query was modified, and determine based on the results of the verification of the unique identifier and comparison of the hash sums whether to update or not the level of trust of the user device.

In yet another aspect, determining, based on the level of trust, how to process the one or more queries includes, but not limited to rejecting one or more queries from the security software, processing the data contained in a query using a file reputation service, processing the data contained in a query using a whitelist service, processing the data contained in a query using a statistics service, processing the data contained in a query using an anti-spam service, and providing an update to the security software of the user device.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

FIG. 18 is a detailed block diagram of one example embodiment of the system for protecting cloud services from unauthorized access and malware attacks.

DETAILED DESCRIPTION OF EXAMPLE EMBODIMENTS

Example embodiments of the present invention are described herein in the context of systems, methods and computer program products for protecting cloud-based reputation and other security services from unauthorized access and malware attacks. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1A:
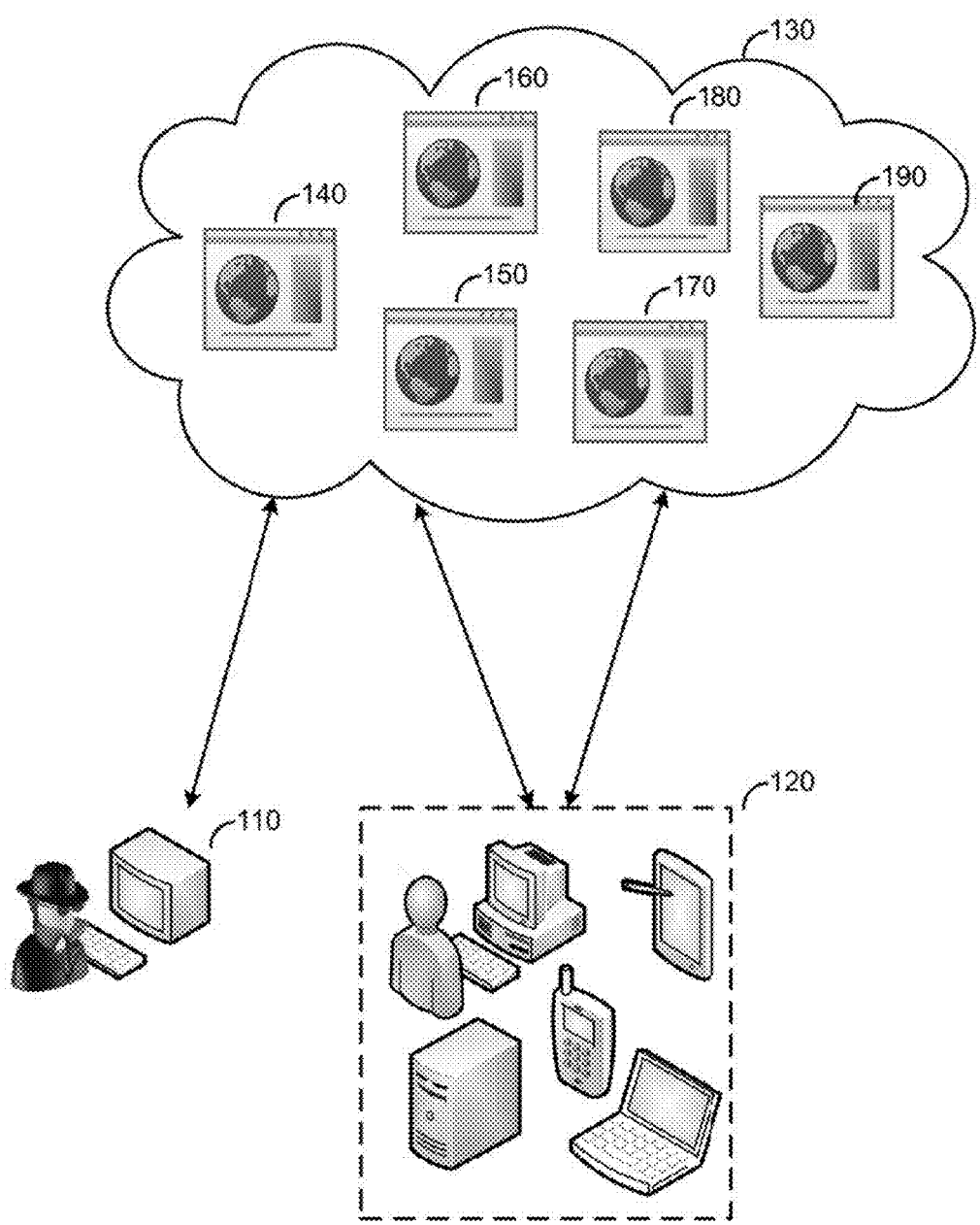
FIG. 1A is a high-level diagram of one example embodiment of the system for protecting cloud services from unauthorized access and malware attacks.

FIG. 1A illustrates a high-level diagram of one example embodiment of the system for protecting cloud services from unauthorized access and malware attacks. The system includes a cloud infrastructure 130 (also referred as a remote server) that provides a plurality of reputation-based and other services 140-190 to user computers 110 and 120. In one aspect, the cloud infrastructure can be provided by an antivirus company. One example of the cloud infrastructure 130 is a Kaspersky Security Network (KSN). The system also includes a plurality of user devices 120 (e.g., PCs, notebooks, smartphones, tablets, servers, and the like) that belong to the authorized users of the security software deployed on the user devices 120 (e.g., users who have on their devices 120 security software or other software or hardware security products licensed/registered with the cloud infrastructure 130). The system may also include one or more user devices 110 belonging to unauthorized (e.g., unregistered) users.

In one example embodiment, the user devices 120 may have antivirus software, such as Kaspersky Internet Security, installed thereon, or other type of security software or hardware that protects the user device 120 from security threats. In one aspect, the antivirus software may be configured to automatically and periodically collect from the user device and send to the cloud infrastructure 130 information about malware detected on the user devices 120, unknown and/or suspicious software objects (e.g., files, applications, scripts, web pages, etc.) downloaded to and executed on the user devices 120, and other security related information. These software objects may be originated from websites, email attachments, peer-to-peer networks and the other sources, as described, for example, in the commonly owned U.S. Patent Application No. 2011/0083180, which is incorporated by reference herein.

In one example embodiment, the cloud infrastructure 130 provides a plurality of security services, such as a file reputation service 140, an internet address reputation service 150, a statistics service 160, a whitelist service 170, an anti-spam service 180, software activation service 190, and other types of services. The services 140-190 may be hosted by one or more network servers in the cloud infrastructure 130. In one aspect, the file reputation service 140, at the request of the antivirus software, provides information about software objects, such as files and programs, as to whether or not the object is found in a malicious file database (e.g., antivirus database 138 of FIG. 2B), the date of the first appearance of the file among users of the antivirus software, the number of users who trust the file, and the distribution of the file by countries and/or regions. In one aspect, the internet address reputation service 150 provides information about software objects, such as internet addresses of websites, as to whether or not malicious content, such as links to malicious files, is found on these websites, and the popularity of these websites in terms of the number of visitors. In one aspect, the statistics service 160 which collects statistics information, such as metadata (e.g., hash sum, signature, name, address path, etc.)

about files executed and/or downloaded by user devices 120, which can be used to reach a verdict as to whether the file is safe or malicious, in order to correct whitelists, and to reduce the number of false positive malware detections. In one aspect, the whitelist service 170 contains a list of known safe objects (e.g. files, internet addresses, etc.), and can check a specified object against this list at the request of the antivirus software. In one aspect, the anti-spam service 180 checks software objects, such as emails, for spam using anti-spam filters and a database of blacklisted senders. In one aspect, the software activation service 190 is used to activate/renew licenses of the antivirus software 121.

Figure 1B:
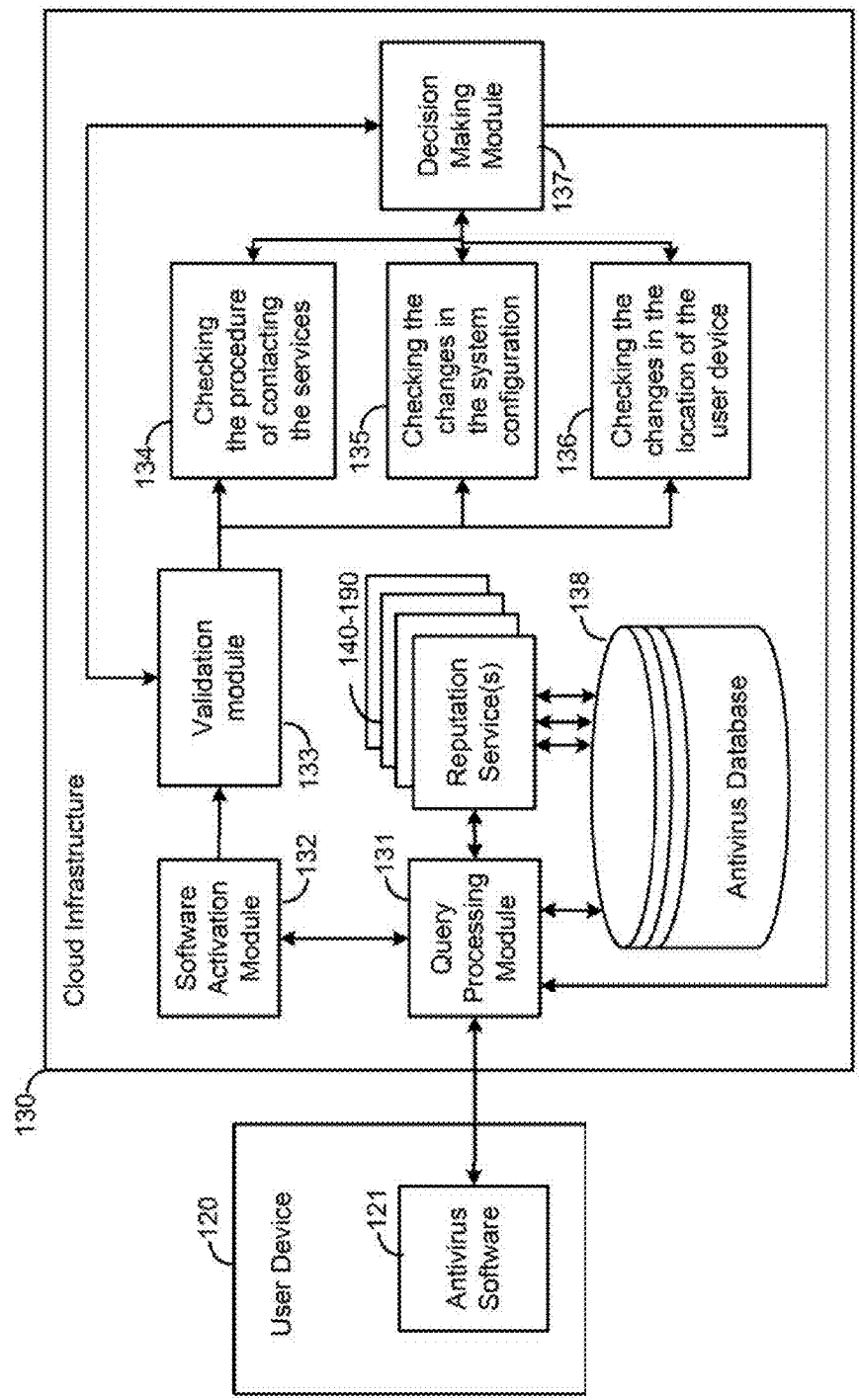

FIG. 1B illustrates a more detailed diagram of one example embodiment of the system for protecting cloud services from unauthorized access and malware attacks. The user device 120 includes antivirus software 121 (which may include both the software, firmware and hardware components), which is used for protection of user device 120 from malware and other security threats. In one aspect, the antivirus software 121 can perform antivirus analysis, e.g., signature analysis, heuristic analysis, emulation, etc., on software objects, e.g., files, programs, e-mails, etc., downloaded or stored on the user devices 120. In another aspect, the antivirus software 121 also configured to send queries to one or more cloud services 140-190 in the cloud infrastructure 130 to perform additional reputation analysis and/or other types of malware analysis, e.g., signature analysis, heuristic analysis, emulation, etc., of suspicious or unknown software objects detected on the user device 120. In one aspect, the queries from antivirus software 121 with the information about, e.g., suspicious objects or objects executed or downloaded on the user device 120, may be received by the query processing module 131 of the cloud infrastructure 130. The module 131 may in turn activate one or more reputation services 140-180 that perform antivirus analysis of the received information, and, based on the determination of decision-making module 137, return the results of the antivirus analysis to the antivirus software 121. The query processing module 131 may also use conventional malware analysis methods to analyze the suspicious software object, when, for example, none of the reputation service 140-180 can determines whether the suspicious object is malicious or safe.

In one example embodiment, the cloud infrastructure 130 further includes a software activation module 132, which perform activation of licenses for new antivirus software 121 on user devices 120 (and/or 110), and renewal of expired licenses. In one aspect, the activation module 132 functions as activation service 190. For example, during activation of new antivirus software 121 of the user device 120, the antivirus software 121 sends to the activation module 132 an activation code (e.g., a unique set of symbols used for activating the license of the antivirus software). The activation module 132 checks the received activation code against a database of official codes. For the legitimate activation code, the activation module 132 may, in one example aspect, assign to the associated antivirus software 121 deployed on user device 120 a unique identifier (e.g., product ID), create an activation key (e.g., a file containing data required for the operation of the antivirus software 121 and information about the period of validity of the activation key (e.g., 30 days)), and return the activation key to the antivirus software 121, so that antivirus software 121 can be activated on the user device 120. In another example aspect, the activation module 132 may assign the unique identifier to the user device 120 when the antivirus software 121 deployed on that user device 120 sends its first query to the cloud services 140-190. In one example aspect, the unique identifier may be the same or based on the activation code. After the expiry of the period of validity, the activation module 132 may create a new activation key, if the subscription of the user of the user device 120 to the antivirus software 121 has not terminated.

In one aspect, the product ID may be linked to the hardware/software configuration of the user device 120 on which the antivirus software 121 is deployed. For example, the product ID may be created using the hard disk serial number (e.g., the CRC sum of the hard disk serial number) of the user device 120, the MAC address, or other unique identifiers of components of the user device 120. In another aspect, the product ID is created on the basis of an activation code or the activation key of the antivirus software 121. In another aspect, the product ID may contain information about the type of the user device 120 (e.g., a PC or a smartphone). In yet another aspect, the product ID may be signed with a digital electronic signature of the cloud infrastructure 130 to assure the authenticity of the product ID.

In one example embodiment, the cloud infrastructure 130 further includes a validation module 133 configured to validate the level of trust of the user devices 110 and 120, which send queries to the cloud infrastructure 130, before processing queries from these devices. In one aspect, the validation module 133 is also configured to update the level of trust of the user devices 110 and 120 based on, e.g., the analysis of queries from these devices. The validation of trust of the user devices 110 and 120 is performed in order to protect cloud services from unauthorized access and malware attacks from devices 110. In different aspects, the validation module 133 is configured to perform different trust validation mechanisms. For example, in one aspect, the validation module 133 may use a mechanism 134 for checking the accuracy of the procedure used by user device 110 or 120 to contact (e.g., send queries) to the cloud services 140-190. In another aspect, the validation module 133 may use a mechanism for checking changes in the system configuration of the user device, which send a query to the cloud services. In yet another aspect, the validation module 133 may use a mechanism for checking changes in the location of the user device 110 or 120. These checking mechanisms, which will be described in a greater detail below, allow cloud infrastructure 130 to determine whether queries to the cloud services 140-190 come from legitimate user devices 120 of from user devices 110, which are trying to gain unauthorized access or operate under the control of a malware. The results of the validity checks 134, 135 and 136 are processed by the decision-making module 137, which determines the level of trust of the user devices 110 or 120.

In another example embodiment, the cloud infrastructure 130 further includes an antivirus database 138, which contains information used by the query processing module 131 and reputations services 140-190 to form responses to the queries sent from the user devices 110 and 120. For example, the antivirus database 138 may contain information about user devices 110 and 120 (e.g., activation codes, product IDs, levels of trust, etc.). Using this information, the query processing module 131 may check the current level of trust of the user devices 110 and 120, which send queries to the cloud services 140-190, before deciding whether to pass these queries to the cloud services 140-190. The reputation services 140-180 may use information stored in the antivirus database 138, such as whitelists, malicious file databases, etc., to perform analysis of software objects for presence of malware.

Figure 2:
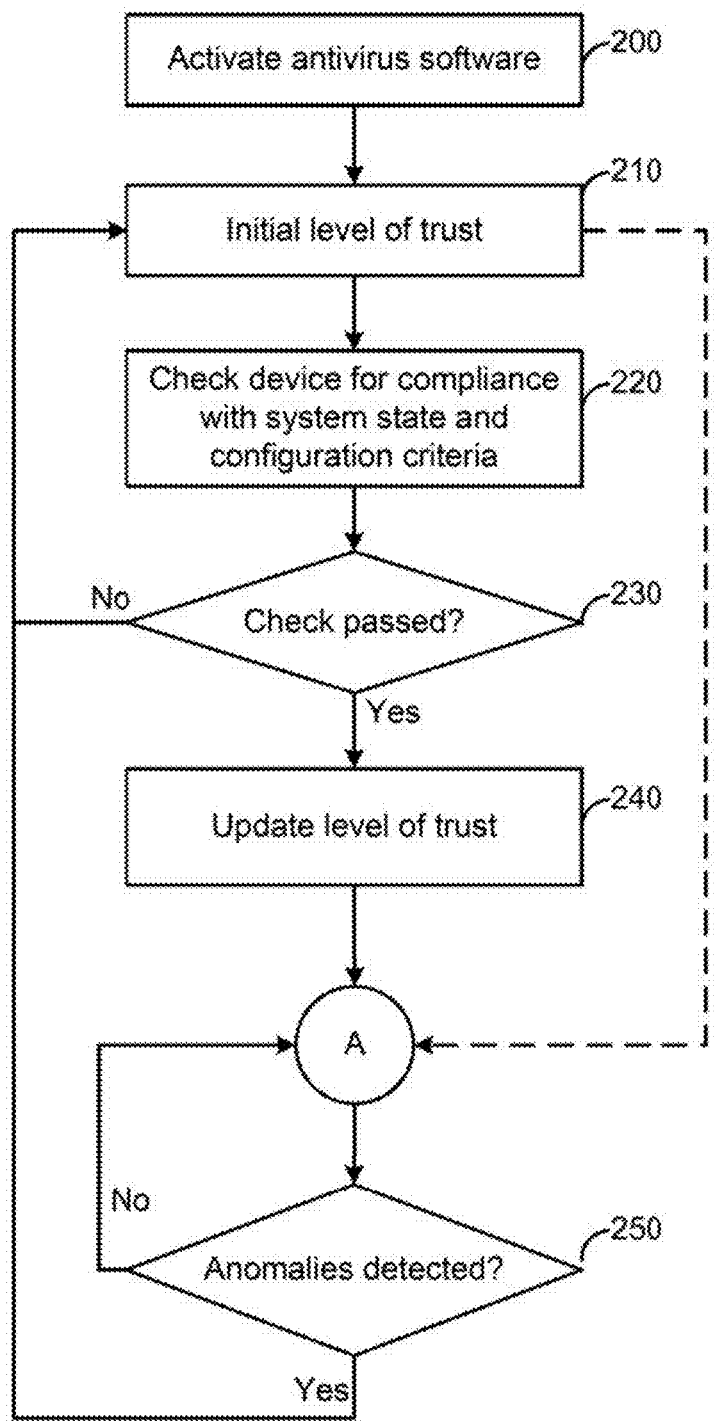
FIG. 2 is a high-level flow diagram of one example methodology for protecting cloud services from unauthorized access and malware attacks.

FIG. 2 illustrates a high-level flow diagram of one example methodology for protecting cloud services from unauthorized access and malware attacks. As shown, at step 200, the software activation module 132 of the cloud infrastructure 130 activates an antivirus software 121 installed on a user device 110 or 120. As explained above, during activation, the activation module 132 assigns a unique product ID to the antivirus software 121 of the user device 120 (or user device 110). At step 210, the decision-making module 137 assigns to the newly created product ID of a user device an actual level of trust having value of "untrusted". In one aspect, the query processing module 131 of the cloud infrastructure 130 receives queries from user devices 110 and 120, forwards them to the appropriate services 140-190, and sends responses from the cloud services back to the user devices 110 and 120. In another aspect, the cloud services 140-190 may directly receive queries and respond thereto without assistance of the module 131. In yet another aspect, the decision-making module 137 analyses and filters received queries, having a product ID therein, based on the level of trust of the user devices which sent these queries. For example, in one aspect, some reputation services 140-180 will not send responses to queries (i.e., reject queries) received from a user devices that have "untrusted" level of trust (i.e., untrusted devices). In another aspect, some reputation services 140-180 may send responses to queries from user devices that have "untrusted" level of trust, but will not take into account the data received from these untrusted user devices, such as verdicts as to the safety or maliciousness of software objects analyzed by antivirus software 121 on these devices or statistics on the execution of software objects, when making decisions as to the safety or harmfulness of these software objects and when making changes to the statistics and reputation of the these software objects in the antivirus database 138.

At step 220, the antivirus software 121 may collect from the user devices 120 and send to the validation module 131 various system state and configuration data that can be checked by the validation module 133 for compliance with certain system state and configuration criteria to determine whether the user device 120 is actually used in a manner appropriate for this type of the device. Based on the results of this check, the validation module 133 may update the level of trust of user device 120 from "untrusted" to "trusted".

For example, when the user device 120 is a computer, notebook, smartphone, tablet or similar personal computing device, which is being used for its intended purpose by the user, these system state and configuration criteria may include the following criteria: detection of execution on the user device 120 of various processes and services characteristic of the operating systems (OS) installed on the user device 120; periodic rebooting of the operating system; the installation and/or deletion of new programs on the user device 120; execution of programs on the user device 120; browsing of different web pages located at different internet addresses using a web browser on the user device 120; periodic updates of operating systems, installed applications and antivirus software 121 of the user device 120; detection of user's keystrokes, mouse clicks and mouse movements; tracking of the user's movements by the webcam; and other actions characteristic of users working on the user device 120. For example, for Windows-based user devices 120, authorized users typically install a standard set of programs (e.g., Google Chrome and Adobe Reader) that trigger associated OS services (e.g., Google Updater Service and Adobe Acrobat Update Service respectively). Likewise, UNIX-based user devices 120 are characterized by the operation of so-called "daemons" (i.e., services operating in the background mode), such as a network protocol server or an "init" process. Furthermore, users typically install popular applications such as browsers, games and IM clients, etc. on their user device 120. However, the operation of these services and applications is not characteristic of environments artificially created by malicious parties.

In another aspect, the device 120 may be a server (e.g., e-mail server or application server), which operates independently, without the direct participation of a user. In this case, the system state and configuration criteria for confirming the legitimacy of the server device 120 may be different from those for personal user devices 120 described above. The server criteria may include, e.g., the detection of execution of updates of the operating system, installation of programs and antivirus software, and the evaluation of the period of time between the issue of an update and the installation of this update on the server device 120.

Having analyzed the state and configuration data of the user device 120, if the valuation module 133 does not detect the above system state or configuration events or other changes in the state or configuration of user device 120 during a certain time period (also referred as the period of non-trust), which can be measured since the last analysis of the user device, or a predefined period, e.g., five days, the valuation module 133 may conclude that that user device 120 is being used not by a "real" user but by malware, which sends known false queries to the cloud infrastructure 130, or that requests to the cloud infrastructure 130 are being sent from a malware installed on a virtual machine. In this case, the valuation module 133 will consider that the check at step 230 has failed and will not update the level of trust of the user device 120, so that the level of trust of the user device 120 will remain at its initial level of "untrusted". However, if the user device 120 complied with some or all of the above listed state or configuration criteria and/or additional state or configuration criteria shown in Table 1 below, then the check is considered to be passed at step 230 and the valuation module 133 may update the level of trust of the user device 120 to "trusted" at step 240.

In one aspect, the specified period of non-trust may be changed dynamically. Reasons for these changes may include statistical data received from non-trusted user devices 120. For example, if an analysis of 10,000 non-trusted user devices 120 reveals that in 95% of cases the cloud infrastructure 130 has made the decision to include the product ID of the user device 120 in the list of non-trusted IDs after three days, the period of non-trust may be changed from five to three days. In another aspect, the period of non-trust may be different for different types of device (for example, five days for a PC and two days for a mail server).

In yet another aspect, the period of non-trust may be changed dynamically according to the season of the year and/or international or regional criminal activity. For example, during the New Year holidays, there is usually an increase in spamming activity and corresponding increase in the number of malware infections of user devices 120. Therefore, during these periods of time, the number of illegitimate queries with "whitelist" malicious objects and "blacklist" authorized objects may increase significantly. It should be also noted that antivirus software 121 may check for software updates in the cloud infrastructure 130, which prevents a possibility of receiving illegitimate software updates from malefactors.

In one aspect, the system state and configuration checks may be performed by the antivirus software 121 on the user device 120. In this case, when the user device 120 has been checked for compliance with the system state and configuration criteria, the antivirus software 121 may send a report to the cloud infrastructure 130 that contains the results of the system state and configuration check and the product ID associated with the user device 120. In one aspect, the report may also contain information about the type of the user device 120.

At step 230, the valuation module 133 makes decision, based on the system state and configuration criteria for the user device 120, as to whether update or not the level of trust of the user device 120. Table 1 shows one example of a set of system state and configuration criteria for determining the legitimacy of the user device 120 when the device is a PC.

TABLE 1

| No. | Criterion |
|---|---|
| A1 | The most recent operating system update was installed in the device not more than four days after the issue of the update |
| A2 | At least one software package from the following list is installed on the user's PC: [browser, IM client, game] |
| A3 | The user opened at least one web page in the browser within five days following the activation of the antivirus software. |
| A4 | The operating system log contains information about power switch-on/switch-off or switching to or from hibernation/sleep mode within five days following the activation of the antivirus software. |
| A5 | Keystrokes and mouse movements were recorded within five days following the activation of the antivirus software. |
| A6 | According to the update report for the user's antivirus software, updates must have been downloaded within five days following the activation of the antivirus software. |
| B1 | A request containing the results of a check of criteria A1-A6 was received from the ID corresponding to the user's software. |
| B2 | Updates were installed in the device within five days following the activation of the antivirus software. |
| B3 | Requests for checking the user's files/statistics/verdict were received from an ID corresponding to the user's software. |

In Table 1, system state criteria A1-A6 may be checked by the antivirus software 121 in the PC 120, while criteria B1-B3 may be checked in the cloud infrastructure 130.

Table 2 below shows an example list of rules for checking criteria A1-A6 and B1-B3.

TABLE 2

| No. | Rules | Trusted? |
|---|---|---|
| 1 | B3 and A6 and not B2 | no |
| 2 | Not B1 and B2 | no |
| 3 | A1 and A2 and A3 and A4 and A5 | yes |

The first rule in the Table 2 indicates that, if requests were made to the cloud infrastructure 130 within five days following the activation of the antivirus software 121 from the user device 120 (criterion 83), and according to the update report the updates must have been downloaded to the user device 120 (criterion A6), but no contacts were made with the update server by the antivirus software 121 (negation of criterion B2), then the operating logic of the antivirus software 121 in the user device 120 conflicts with that which is specified by the producer of the antivirus software 121. In this case, the cloud infrastructure 130 will consider that requests received from the user device 120 are "untrusted", and that the user device 120 is a computer belonging to a malicious party 110. The second rule in the Table 2 indicates that the user device 120 will be considered "not trusted" if the update of the antivirus software 121 was downloaded to the user device 120, but none of the checking criteria A1-A6 was received from the user device 120 within five days following the activation of the software. According to the third rule, the user device 120 will be considered "trusted" if criteria A6-A6 are met simultaneously. If, even one of the rules in the Table 2 is not complied with, it can be considered that the user device 120 is to be treated as "not trusted".

Thus, if the check of user device 120 performed at step 220 has failed, it may be concluded at step 230 that the user device 120 has a malware, or it is under the control of an authorized user, in which case the initial "untrusted" level of trust should be maintained. In one aspect, the check of user device 120 for compliance with system and state configuration criteria may be repeated after a certain period of time (e.g., one month). In one aspect, steps 210-230 may be omitted, in which case the user device 120 is granted a "trusted" level of trust, at step 240, right after the activation of the antivirus software 121. In another aspect, after the activation of the antivirus software 121, the user device 120 may be assigned the "trusted" level of trust, and the check carried out in steps 220-230 may be performed subsequently.

However, a trusted user device 120, which complied with all the system state and configuration criteria at step 230, may still be later infected by malware, which was not detected by the antivirus software 121. A malware infection of a device 120 may occur as a result of incorrect action by the user (for example, clicking on a malicious link or opening an attachment of an email containing spam). This malware can modify queries sent by antivirus software 121 to the cloud services 140-190, or can independently send false queries to the cloud services 140-190. Therefore, despite the fact that the user device 120 has passed the system and state configuration check, it may still be infected with the malware that can cause damage to the cloud infrastructure 130. Furthermore, a malicious party may use the activation key of a trusted user device 120 for a plurality of other devices after passing the system check for compliance with the criteria. Therefore, it is desirable to continue checking legitimacy of devices 120. To that end, in one aspect, the valuation module 133 may also periodically perform additional checks to reassess the current level of trust given to each user device 120.

Therefore, after step 240, at stage "A", another set of complex checks may be performed by the cloud infrastructure 130 to determine if any anomalies in the behavior or configuration of the trusted user device 120 have appeared which would question legitimacy of user device 120 and trigger reevaluation of its current level of trust. Stage "A" is described in greater detail in FIG. 3. If at step 250, the cloud infrastructure 130 detects anomalies in the behavior or configuration of the trusted user device 120, it may change the level of trust of the user device 120 back to the "untrusted" at step 210. In one aspect, stage "A" may be executed in parallel with the system state and configuration check carried out at step 220. In another aspect, if anomalies are detected in step 250 before the completion of the system state and configuration check of the user device 120, this system check may be forced to terminate, and the "not trusted" level of trust will be retained for the user device 120.

Figure 3:
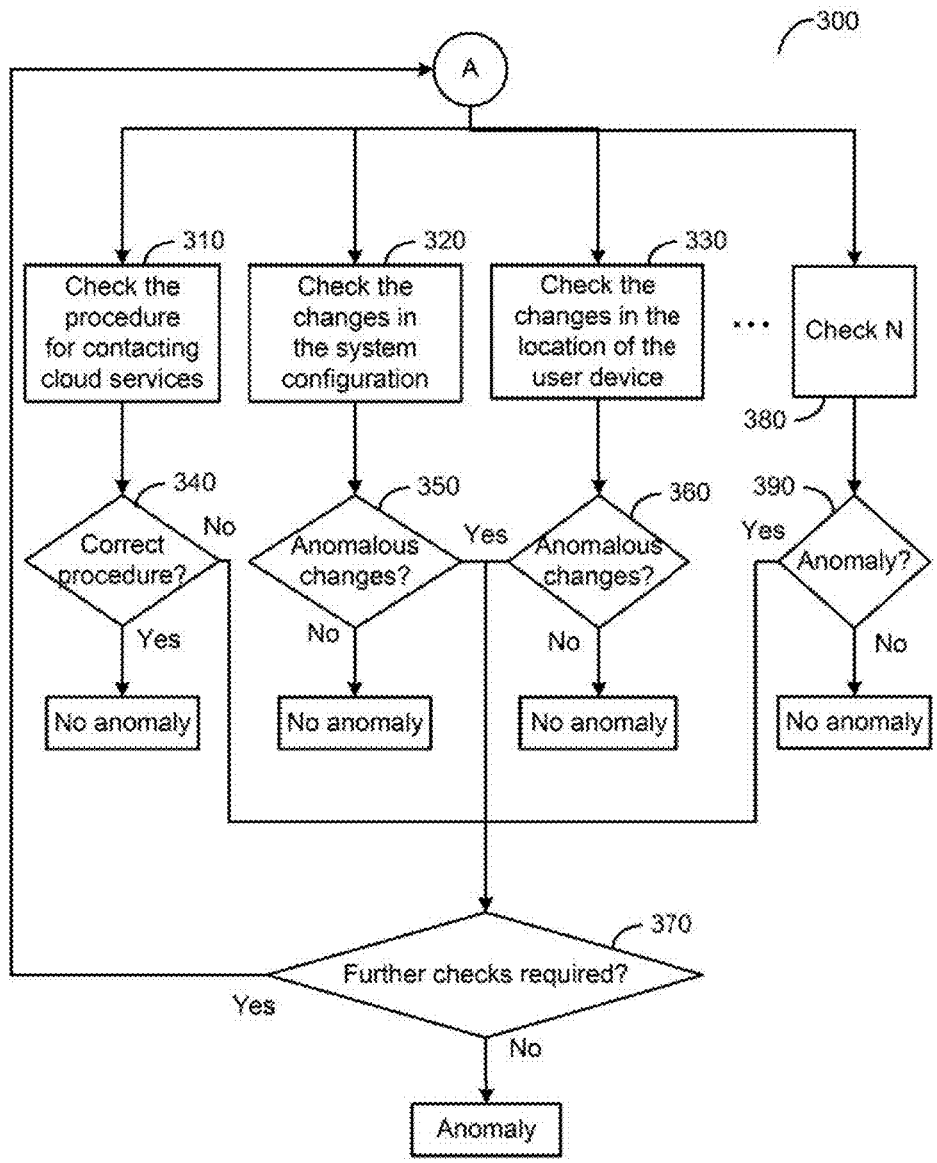
FIG. 3 is a flow diagram of another example methodology for detecting anomalies in the behavior or configuration of a user device.

FIG. 3 illustrates a flow diagram of an exemplary method of detection of anomalies in the behavior or configuration of a user device, which is performed at stage "A" of FIG. 2. In various aspects, the process 300 can be performed by the valuation and decision making modules 133 and 137 of the cloud infrastructure 130 or by the antivirus software 121 deployed on the user device 120. Thus, in one aspect, at step 310, the valuation module 133 can check if the procedure by which the antivirus software 121 of the user device 120 contacts the cloud services 140-190 is correct or not. The cloud infrastructure 130 requires certain procedures for contacting different services 140-190. To that end, the antivirus software 121 includes rules which specify the right procedure for contacting cloud services 140-190. For example, if the antivirus software 121, after performing an antivirus check, could not confirm whether a file on the user device 120 is clean or malicious, it can send query to the whitelist service 170 followed immediately by another query to the file reputation service 140. After obtaining full details of the checked file from the cloud services 140 and 170, the antivirus software 121 can reach a final verdict on the file and sends the statistical metadata about the file, as well as the verdict, to the statistics service 160. However, a malicious party, being unaware of the operating logic of the antivirus software 121, may contact the cloud services in an incorrect sequence of steps, or completely fail to contact some of the cloud services. For example, a malicious party may send only false statistics about files to the statistics service, containing verdicts stating that authorized files are malicious, or, conversely, that malicious files are safe.

In one aspect of the procedure for contacting the cloud services 140-190, the antivirus software 121 may, for example, place an incriminating index in each query, which will be incremented by one on each subsequent query from the user device 120 with a certain product ID. If the valuation module 133 detects two successive queries from a given product ID contain indices with an incorrect difference between them, the valuation module 133 may conclude that an anomaly in the contacting procedure is present for the given product ID.

In another aspect, the check of the procedure for contacting the cloud services may be performed using a table containing the product IDs of different mobile devices 120, the identifier of the service contacted by the antivirus software 121 with this product ID, and the times of the contacts made with this service. Thus, when the statistics service 160 receives a query from a user device 120 associated with a certain product ID, it can check in the table to see whether the file reputation service 140 and the whitelist service 170 have been contacted previously. In one aspect, the statistics service 160 may also check the time difference between two consecutive contacts with the cloud services, and, if this time is shorter than the previously specified time (five seconds, for example), it will consider that the contact of the user device 120 with this product ID with the cloud services has not complied with the procedure; an anomaly will then arise and the user device 120 will be considered to be "not trusted".

Therefore, if the procedure for contacting the cloud services, ascertained in step 340, has not been followed (e.g., if a request has been made to the whitelist service 170, but this has not been followed by a request to the file reputation service 140), then in the next step 370 the decision-making module 137 of the cloud infrastructure 130 can determine whether there are sufficient grounds to believe that the user device 120 is controlled by a malware or unauthorized user and whether further checking of the user device 120 may be required. This decision may be based on how much the contacting procedure followed by the user device 120 differs from the established contacting procedures and/or how often has the user device 120 followed the incorrect contacting procedure, which may indicate a malicious behavior pattern.

In case further checking is required at step 370, in one aspect, the additional checks may include, but not limited to checking, at step 320, the changes in the configuration of the user devices 121, and checking, at step 330, changes in the location of the user device 120. However, if no further checks are required, the decision-making module 137 may classify any queries received from the user device 120 as anomalous, in which case the level of trust of the user device 120 will be returned to its initial "untrusted" level of trust. If the procedure for contacting the cloud services has been followed, the decision is made at step 340 that there are no anomalies and the additional checks at stage "A" may be continued or terminated.

In another aspect, when the procedure for contacting the cloud services has been followed, the frequency of contacts with the cloud services (the number of requests per unit of time) may also be checked. If the frequency of queries is greater or lower than a specified value, an anomaly arises. It should be noted that the rules for contacting the cloud services 140-150 may change periodically. The new rules may be sent to the licensed antivirus software 121 together with periodic updates of the antivirus records used by the antivirus software 121. Thus, even if a malicious party has discovered the correct procedure for contacting the cloud services, it will be unable to pass the check in step 310 after the update, while in the period before the update the check may be carried out in parallel with the check of changes in the configuration of the user device 120 at step 320, and with the check of changes in the location of the user device 120 at step 330. Each of the checks 310, 320 and 330 may be carried out after a period of time specified for the check in question (for example, one day or one week), or when specified conditions are met (for example, on each start-up of the antivirus software).

More specifically, at step 320, the valuation module 133 of the cloud infrastructure 130 may check whether, and how quickly, the hardware configuration of the user device 120 with a certain product ID has changed. For example, if the hard disk or motherboard identifier of the user device 120 has changed several times in a week, there is reason to believe that queries to the cloud infrastructure 130 have been sent from different devices having the same product ID. Frequent hardware changes are not characteristic of PC users, and especially not characteristic of servers and smartphones, in which hardware changes are extremely rare. Therefore, a decision that an anomaly is present in the data received from the user device 120 is made in step 350, and a decision whether to perform additional checks is made at step 370.

At step 330, the valuation module 133 of the cloud infrastructure 130 may check whether location of the user device 120 has changed. In one aspect, when the user device 120 is a server, information is present in the cloud infrastructure 130 about the organization which owns the server with the specific product ID and which, consequently, owns a range of possible values of IP addresses of the server 120. Thus, if the queries to the cloud infrastructure 130 are received from the same product ID, but from different ranges of IP addresses, then the decision that an anomaly has occurred is made in step 360 and the next step will be 370.

In another aspect, when the user device 120 is a PC, the frequency of changes in the location of the PC 120 is checked in step 330. In one aspect, the valuation module 133 can create a table for the product ID of the checked user device 120 that contains a number of unique IP addresses, which send statistics information to the statistics service 160, and the subnetwork and/or domain zone and/or autonomous system number and/or state corresponding to the IP address. If queries for the same product ID have been received from different subnetworks and/or domain zones and/or autonomous systems and/or states within a specified time interval (one week, for example), then, when a specified threshold value is reached (for example, two different countries or five different subnetworks), this behavior is classified in step 360 as anomalous for the PC 120, and the next step will be 370.

In another aspect, when the user device 120 is a mobile telephone, smartphone, tablet PC or notebook, frequent subnetwork changes are characteristic of this kind of device, but frequent changes of country or domain zone are not. Based on these considerations, it can be determines, at step 360, if the behavior of the user device 120 is anomalous.

Next, at step 370, the decision-making module 137 determines whether there are sufficient grounds to conclude that the user device 120 is controlled by a malware or unauthorized user and whether further checking of the user device 120 may be required. If decision-making module 137 determines that the user device 120 is controlled by a malware or unauthorized user, the decision-making module 137 will update the level of trust user device 120 to the "untrusted" level, and restrictions will be placed on all queries received from the user device 120. In one example aspect, the level of trust in the user of device 120 with a specific product ID may have more than two values, as shown in Table 3 below.

TABLE 3

| Level of trust | Restrictions on the product ID |
|---|---|
| 1 | Put the product ID on the blacklist, do not send responses to the product ID, and ignore any processing requests containing this ID. |
| 2 | Send responses to the product ID. Ignore verdicts contained in requests from the product ID. |
| 3 | No restrictions (e.g., process all requests from this product ID) |

In this aspect, one of the possible values of the level of trust may be assigned to the user device 120 with the specified product ID in steps 210 and 240 of FIG. 2. For example, immediately after the activation of the antivirus software 121 on the user device 120, it may be impossible to determine precisely whether the user device 120 is under the control an authorized user or a malicious party or whether the product ID of the user device 120 is being used on another malicious device 110. Therefore, at step 210, the decision-making module 137 may assign an intermediate level of trust 2 from Table 3 to the user device 120, which signifies weak restrictions on queries received from user devices having the specified product ID. Thus, the authorized user of the user device 120 will receive comprehensive responses from the reputation services 140-180, but verdicts sent by malicious parties to the cloud infrastructure 130 will be ignored. However, if at step 370, there are sufficient grounds to believe that the product ID under examination is being used by malicious parties, then in step 210 this product ID will be assigned a level of trust 1, which signifies that processing queries received from devices with this product ID will be completely ignored by the cloud services. On the other hand, if the decision-making module 137 determines that the user device 120 have passed checks 310, 320 and 330, its product ID will be given level of trust of 3 at step 240.

In another aspect, stage "A" may include additional checks on the devices 120 for compliance with criteria proposed for a device belonging to an authorized user of the antivirus software 121. For example, one additional check may be check N, carried out in step 380, after which, if an anomaly arises, the next step will be step 370. In one aspect, one of the additional checks may include a check on the replication of the product ID. For example, an identifier of the antivirus software 121 having a specific product ID may be placed in the query from the user device 120, this identifier being encrypted with a public key of the cloud infrastructure 130, together with a hash sum of the data in the body of the query. Subsequently, in one of the services 140-180 to which this query is addressed, the product ID is decrypted using a private key of the cloud infrastructure 130, and the hash sum is calculated from the body of the query and compared with the hash sum sent by the user device 120. If the decrypted product ID does not match the product ID of the device from which the query has been received and/or the hash sums do not match, an anomaly arises. This check prevents malicious parties from sending to the cloud infrastructure 130 queries with a stolen product ID and/or modified data in the body of the query. In one aspect, a different priority may be given to the checks 310, 320, 330, and 380 in step 370. Table 4 shows an example of the assignment of weight coefficients for checks having different priorities. Depending on the overall weight of the checks carried out (an example of compliance is shown in Table 5), in step 370 the decision-making module 137 makes the decision to take further action.

TABLE 4

| Check | Weight |
|---|---|
| Procedure for contacting the services 310 | 4 |
| Change in the hardware configuration 320 | 1 |
| Check on changes in the location of the system 330 | 2 |
| ... | |
| Check N | 1 |

Thus, for example, when there is a frequent change in the system configuration of the checked user device 120, if an anomaly arises after this check it is assigned a priority with a weight of 1. The check of the procedure for contacting the services 310 can determine the user's legitimacy more accurately, and can therefore be assigned a priority with a weight of 4. If a number of checks with different weights have been carried out simultaneously, the total weight is a function of the performed checks (for example, it is equal to the sum of weights or the maximum weight of the checks). Table 5 shows an example of the decisions made in step 370 according to the total weight. For example, if the total weight is 3, at least one further check with a weight of 1 may be carried out in order to identify an anomaly, and, if the total weight remains at its previous level after this check, it is concluded that no anomaly is present. On the other hand, if the total weight is 4, it is concluded that an anomaly has arisen, and in step 210 the product ID under examination is assigned "untrusted" level of trust.

TABLE 5

| Weight | Decision made in step 370 |
|---|---|
| 1 | Carry out two further checks having a weight of at least 1 |
| 2 | Carry out one check with a weight of 3 |
| 3 | Carry out a check with a weight of 1 |
| 4 | Anomaly |

In one aspect, a quality rating of the detection of false information may be provided for each type of check 310-330, 380. The detection quality may depend on the number of correctly detected product IDs of malicious parties, and also on the number of false positives, in other words cases where the ID of an authorized user of a device 120 has been classified as "untrusted". The weight of each check may depend on the detection quality rating of the checks, and may also change with changes in the detection quality rating of the checks. For example, after all the necessary checks have passed, no anomalies were detected in step 250, and the product ID is considered to be "trusted". However, a check on changes in the system configuration 320 has detected an anomaly, indicating a false positive. If the number of false positives as a proportion of the correct detection of anomalies exceeds 10%, then the detection quality rating for the check on changes in the system configuration 320 may be reduced.

Figure 4:
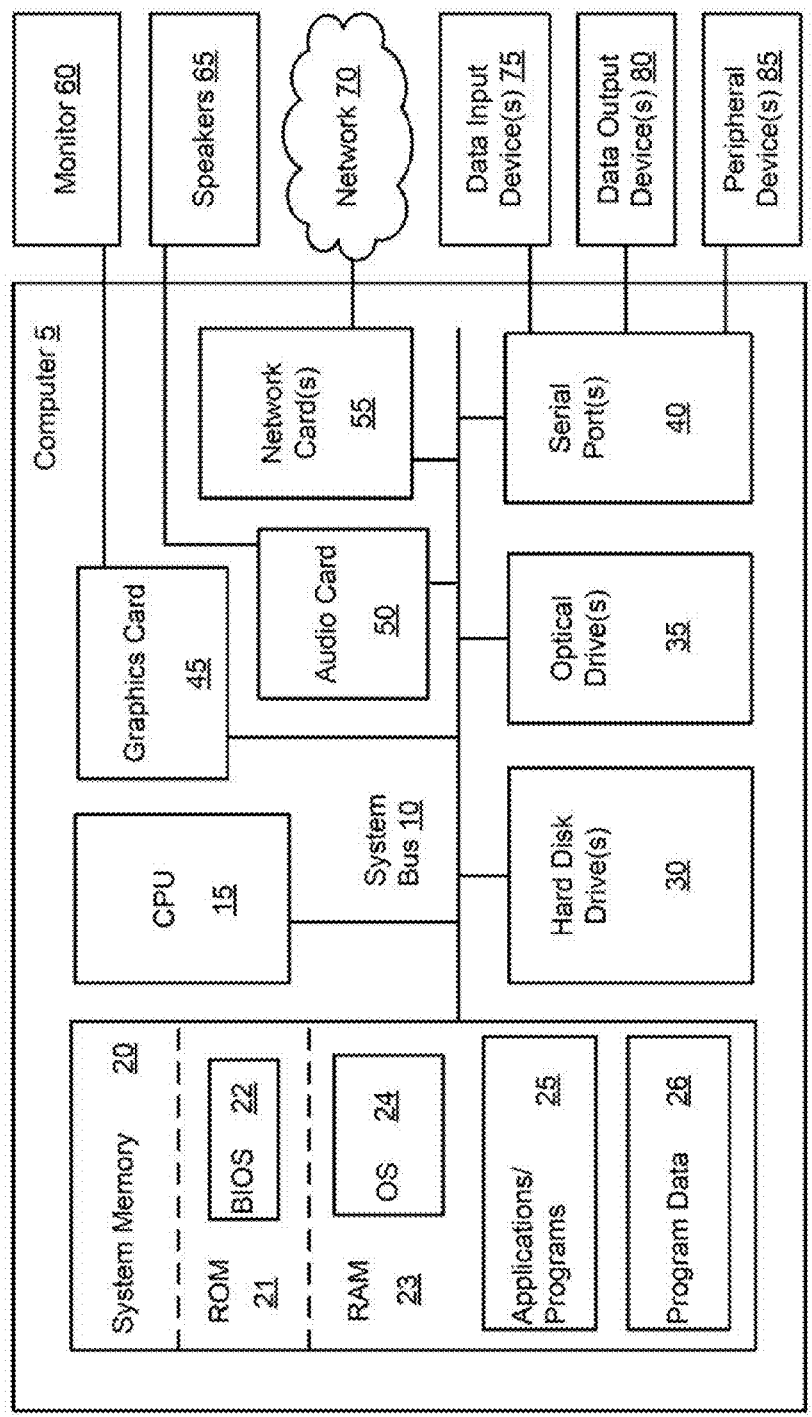
FIG. 4 is a block diagram of a computer suitable for implementing a system for protecting cloud services from unauthorized access and malware attacks.

FIG. 4 depicts one example embodiment of a computer system 5, which could be used to implement the system and methods for protecting cloud services from unauthorized access and malware attacks. In various aspects, the computer system 5 may be a personal computer, notebook, smartphone, tablet, server, or other type of computing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel* Core i5 processors, AMD Opteron 6300 processors or other microprocessor or microcontroller.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® 7 Professional or other type of operating system, that is responsible for management and coordination of processes and allocation and sharing of hardware and software resources in computer system 5. Memory 20 also stores applications and programs 25. Memory 20 also stores various runtime data 26 used by applications and programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the functions may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for processing queries from a user device by a server, comprising:
 receiving, by the server, one or more queries from a security software of the user device directed to one or more cloud services provided by the server, wherein the security software is configured to follow different procedures for contacting one or more different cloud services;
 analyzing the one or more queries received from the security software to determine whether the security software followed a correct procedure for contacting the one or more services, including determining a time difference between two consecutive queries of a cloud service by the security software, and, when the time difference is shorter than a predefined time period, determining that the user device did not comply with the correct procedure;
 based on the determination of whether the security software followed a correct or incorrect procedure for contacting the server, determining whether to update or not update a level of trust associated with the user device;
 determining, based on the level of trust, how to process the one or more queries; and
 providing different responses to the one or more queries from the security software based on the determination of how to process the one or more queries.

2. The method of claim 1, further comprising analyzing a system state and configuration information of the user device to determine the level of trust associated with the user device, the analyzing including checking for one or more of:

execution of various OS processes and services on the user device;
periodic rebooting or updating of the OS of the user device;
installation, execution or deletion of programs on the user device;
Internet browsing activity on the user device;
installations and updates of the security software of the user device;
keystrokes, mouse clicks and mouse movements on the user device; and
movements of a user via a webcam of the user device.

3. The method of claim 1, wherein analyzing the one or more queries received from the security software further includes checking for changes in the state and configuration of the user device in a predefined time period since the last system state and configuration analysis of the user device to determine whether to update or not the level of trust of the user device.

4. The method of claim 1, wherein analyzing the one or more queries received from the security further includes checking for changes in the location of the user device in a predefined time period to determine whether to update or not the level of trust of the user device.

5. The method of claim 1, wherein analyzing the one or more queries received from the security software further includes:
assigning a unique identifier to the user device with security software deployed thereon;
checking whether a query from the security software includes an encrypted unique identifier associated with the user device and a hash sum of the data contained in the query;
decrypting the unique identifier and verifying that the decrypted unique identifier is associated with the user device from which the query was received;
computing a hash sum of the data contained in the received query and comparing the computed hash sum of the received data with the hash sum included in the received query to determine whether the data contained in the query was modified; and
determining based on the results of the verification of the unique identifier and comparison of the hash sums whether to update or not the level of trust of the user device.

6. The method of claim 1, wherein determining, based on the level of trust, how to process the one or more queries includes performing one or more of:
rejecting one or more queries from the security software;
processing the data contained in a query using a file reputation service and sending a response with the results of file reputation analysis to the security software;
processing the data contained in a query using a whitelist service and sending a response with the results of whitelist analysis to the security software;
processing the data contained in a query using a statistics service and sending a response with the results of statistics analysis to the security software;
processing the data contained in a query using an anti-spam service and sending a response with the results of anti-spam analysis to the security software; and
providing an update to the security software of the user device.

7. The method of claim 1, wherein the correct procedure includes contacting different services in a specific order.

8. A system for processing queries from a user device by a server, the system comprising:
a hardware processor configured to:
receive one or more queries from a security software of the user device directed to one or more cloud services provided by the server, wherein the security software is configured to follow different procedures for contacting one or more different cloud services;
analyze the one or more queries received from the security software to determine whether the security software followed a correct procedure for contacting the one or more services, including determining a time difference between two consecutive queries of a cloud service by the security software, and, when the time difference is shorter than a predefined time period, determining that the user device did not comply with the correct procedure;
based on the determination of whether the security software followed a correct or incorrect procedure for contacting the server, determine whether to update or not update a level of trust associated with the user device;
determine, based on the level of trust, how to process the one or more queries; and
provide different responses to the one or more queries from the security software based on the determination of how to process the one or more queries.

9. The system of claim 8, wherein the hardware processor is further configured to analyze a system state and configuration information of the user device to determine the level of trust associated with the user device, the processor further configured to check for one or more of:
execution of various OS processes and services on the user device;
periodic rebooting or updating of the OS of the user device;
installation, execution or deletion of programs on the user device;
Internet browsing activity on the user device;
installations and updates of the security software of the user device;
keystrokes, mouse clicks and mouse movements on the user device; and
movements of a user via a webcam of the user device.

10. The system of claim 8, wherein to analyze the one or more queries received from the security software, the processor further configured to check for changes in the state and configuration of the user device in a predefined time period since the last system state and configuration analysis of the user device to determine whether to update or not the level of trust of the user device.

11. The system of claim 8, to analyze the one or more queries received from the security software, the processor further configured to check for changes in the location of the user device in a predefined time period to determine whether to update or not the level of trust of the user device.

12. The system of claim 8, to analyze the one or more queries received from the security, the processor further configured to:
assign a unique identifier to the user device with security software deployed thereon;
check whether a query from the security software includes an encrypted unique identifier associated with the user device and a hash sum of the data contained in the query;
decrypt the unique identifier and verify that the decrypted unique identifier is associated with the user device from which the query was received;
compute a hash sum of the data contained in the received query and compare the computed hash sum of the received data with the hash sum included in the received query to determine whether the data contained in the query was modified; and determine based on the results of the verification of the unique identifier and comparison of the hash sums whether to update or not the level of trust of the user device.

13. The system of claim 8, wherein to determine, based on the level of trust, how to process the one or more queries, the processor configured to performing one or more of:

reject one or more queries from the security software;

process the data contained in a query using a file reputation service and send a response with the results of file reputation analysis to the security software;

process the data contained in a query using a whitelist service and send a response with the results of whitelist analysis to the security software;

process the data contained in a query using a statistics service and send a response with the results of statistics analysis to the security software;

process the data contained in a query using an anti-spam service and send a response with the results of anti-spam analysis to the security software; and provide an update to the security software of the user device.

14. The system of claim 8, wherein the correct procedure includes contacting different services in a specific order.

15. A computer program product embodied in a non-transitory computer-readable storage medium, the computer program product comprising computer-executable instructions for processing queries from a user device by a server, including instructions for:

receiving, by the server, one or more queries from a security software of the user device directed to one or more cloud services provided by the server, wherein the security software is configured to follow different procedures for contacting one or more different cloud services;

analyzing the one or more queries received from the security software to determine whether the security software followed a correct procedure for contacting the one or more services, including determining a time difference between two consecutive queries of a cloud service by the security software, and, when the time difference is shorter than a predefined time period determining that the user device did not comply with the correct procedure;

based on the determination of whether the security software followed a correct or incorrect procedure for contacting the server, determining whether to update or not update a level of trust associated with the user device;

determining, based on the level of trust, how to process the one or more queries; and providing different responses to the one or more queries from the security software based on the determination of how to process the one or more queries.

16. The computer program product of claim 15, further comprising instructions for analyzing a system state and configuration information of the user device to determine the level of trust associated with the user device, the instructions for analyzing include instructions for checking for one or more of:

execution of various OS processes and services on the user device;

periodic rebooting or updating of the OS of the user device;

installation, execution or deletion of programs on the user device;

Internet browsing activity on the user device;

installations and updates of the security software of the user device;

keystrokes, mouse clicks and mouse movements on the user device; and movements of a user via a webcam of the user device.

17. The computer program product of claim 15, wherein instructions for analyzing the one or more queries received from the security software further include instructions for checking for changes in the state and configuration of the user device in a predefined time period since the last system state and configuration analysis of the user device to determine whether to update or not the level of trust of the user device.

18. The computer program product of claim 15, wherein instructions for analyzing the one or more queries received from the security software further include instructions for checking for changes in the location of the user device in a predefined time period to determine whether to update or not the level of trust of the user device.

19. The computer program product of claim 15, wherein instructions for determining, based on the level of trust, how to process the one or more queries, include instructions for one or more of:

rejecting one or more queries from the security software;

processing the data contained in a query using a file reputation service and sending a response with the results of file reputation analysis to the security software;

processing the data contained in a query using a whitelist service and sending a response with the results of whitelist analysis to the security software;

processing the data contained in a query using a statistics service and sending a response with the results of statistics analysis to the security software;

processing the data contained in a query using an anti-spam service and sending a response with the results of anti-spam analysis to the security software; and providing an update to the security software of the user device.

20. The computer program product of claim 15, wherein the correct procedure includes contacting different services in a specific order.

* * * * *